United States Patent [19]

Cameron

[11] 3,942,305
[45] Mar. 9, 1976

[54] SULKY HITCH

[76] Inventor: Warren L. Cameron, R.D. No. 1, Box 101, Chester Springs, Pa. 19425

[22] Filed: Nov. 15, 1973

[21] Appl. No.: 416,261

[52] U.S. Cl. .................................... 54/2; 280/63
[51] Int. Cl.² ................................. B68B 1/00
[58] Field of Search ............ 54/1, 2, 23, 39, 50, 51; 280/186, 63

[56] References Cited
UNITED STATES PATENTS

| 124,785 | 3/1872 | Boyer | 280/63 |
|---|---|---|---|
| 321,652 | 7/1885 | Siebel | 54/1 |
| 344,009 | 6/1886 | Rosenfield | 280/186 |
| 445,840 | 2/1891 | Russ | 54/38 |
| 566,818 | 9/1896 | Thompson | 280/186 |
| 3,847,408 | 11/1974 | King | 280/63 |

OTHER PUBLICATIONS

Washington Post, May 17, 1973, Section D, p. 1, Picture titled "One to Won."

*Primary Examiner*—Louis G. Mangene
*Assistant Examiner*—J. Q. Lever
*Attorney, Agent, or Firm*—Clarence A. O'Brien & Harvey B. Jacobson

[57] ABSTRACT

A sulky hitch in the form of a generally wishbone-shaped or Y-shaped assembly having two rearwardly diverging tubular members attached to the cut-off forward ends of the conventional shafts of a sulky, upwardly and inwardly curving portions contoured to the hind quarter area of a horse and a forwardly and downwardly extending member attached to an upstanding post on the forward portion of the horse's back.

3 Claims, 4 Drawing Figures

SULKY HITCH

BACKGROUND OF THE INVENTION

1. Field of the Invention

The present invention generally relates to sulkies and more particularly a hitch for connecting a sulky to a horse pulling the sulky in order to enable the horse to more effectively perform and enable the driver more effective control of the horse and safer operation of the sulky.

2. Description of the Prior Art

Sulkies have for many years employed two forwardly extending shafts which extend along opposite sides of a horse pulling the sulky with the forward end portions of the shafts being secured to opposite sides of the horse. While such arrangements have been used in racing for many years, the movement of the horse is considerably restricted which results in certain limitations on the speed attained by the horse.

Recently, there has been developed an arrangement known as a single shaft sulky in which there is a single, generally Z-shaped shaft disposed immediately in front of the driver with a rearwardly extending portion supporting the driver and a forwardly extending portion disposed immediately above the horse and extending forwardly for attachment to a harness post at the forward end of the back portion of the horse. In such arrangements, the stirrups for the driver's feet are located closely adjacent each side of the pole thus providing rather poor balance and stability for the driver. Also, the pole disposed directly in front of the driver has been found to present a dangerous condition in case of an accident inasmuch as a driver being catapulted forwardly would immediately hit the upwardly extending pole that is disposed in front of him. Also, in this type of sulky, the supporting structure for the wheels is disposed interiorly thereof which exposes the wheels with no forks or covering which introduces a dangerous situation since the wheels may more easily hook with wheels of another sulky. Thus, while the single shaft sulky has provided some benefit insofar as the speed of the horse is concerned, many racing officials and horsemen do not consider the single shaft sulky sufficiently safe in operation and the single shaft sulky is generally considered more difficult to drive in view of the driver's feet being closer together.

SUMMARY OF THE INVENTION

An object of the present invention is to provide a sulky hitch of wishbone configuration connected to the cut-off shafts of a conventional sulky immediately forwardly of the conventional stirrups for the feet of the driver with the two side members of the hitch extending forwardly alongside of the hindquarters of the horse and then upwardly to a single forwardly and downwardly extending member oriented above the back of the horse thereby elminating the location of a pole directly in front of the driver and maintaining the feet of the driver spread in a desired widely spaced condition to provide the driver with proper balance and stability and also enable the conventional wheel receiving fork structure to be utilized to reduce the possibility of hooking wheels thus maintaining the safety features of the sulky hitch while also providing the advantages of a single shaft hook-up by freeing the horse of restrictions of movement.

Another object of the invention is to provide a sulky hitch in which the side elements thereof are constructed of tubing which can be telescoped over the ends of the cut-off shafts of a conventional sulky and easily attached thereto with the side members being contoured to the horse and attaches to the harness at a single point thereby eliminating restrictions in movement of the horse and providing an upward pull on the harness at the point of attachment thus taking weight off of the horse due to the driver's weight oriented rearwardly of the rotational axis of the wheels and the downward pitch of the forward portion of the hitch where it attaches to the harness.

Still another object of the invention is to provide a sulky hitch which is easily connected with a conventional sulky after the forwardly extending shafts have been cut off just forwardly of the stirrups with the hitch being relatively simple in construction and inexpensive but yet effective for obtaining the advantages derived from a single point hook-up and maintaining the safety features of a conventional sulky.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
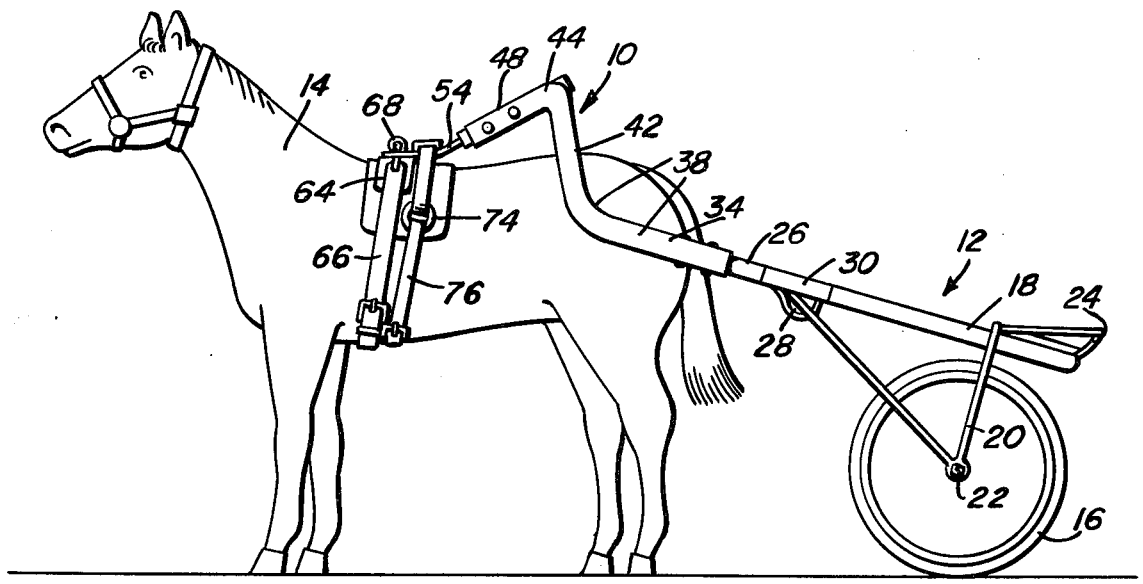
FIG. 1 is a side elevational view of a sulky with the sulky hitch connected thereto and illustrating its association with the harness on the horse.

Referring now specifically to the drawings, the sulky hitch of the present invention is generally designated by reference numeral 10 and is associated with a sulky generally designated by the numeral 12 which is of substantially conventional construction except where it has been adapted for acceptance of the hitch 10. For purposes of illustration, a horse 14 is illustrated in combination with the sulky 12 and sulky hitch 10. The sulky 12 includes two wheels 16 supporting a framework 18 which is arcuately curved and is supported from the wheels by downwardly extending fork assemblies 20 having wheel axles or stub shafts 22 at the lower ends thereof as illustrated in FIG. 1. The sulky 12 also includes a seat 24 supported from the framework 18 with the seat 24 being centrally located and disposed rearwardly of the rotational axis of the wheels 16. The frame 18 includes forwardly extending side members 26 in the form of shafts which normally extend forwardly alongside of the horse 14 for connection with the harness at the forward portion of the horse adjacent the shoulder area in a conventional manner. The shafts 26 include foot stirrups 28 secured thereto by suitable brackets 30 so that the driver seated upon the seat 24 may position his feet in the stirrups 28 in a well known manner to provide wide spacing of his feet for stabilizing and balancing himself during a race thus leaving his hands free to properly control the horse. All of the aforementioned description of the sulky represents a conventional sulky with the shafts 26 normally extending forwardly some 86 to 88 inches and being tied down on each side of the horse which restricts movement of the horse to a certain extent.

Figure 2:
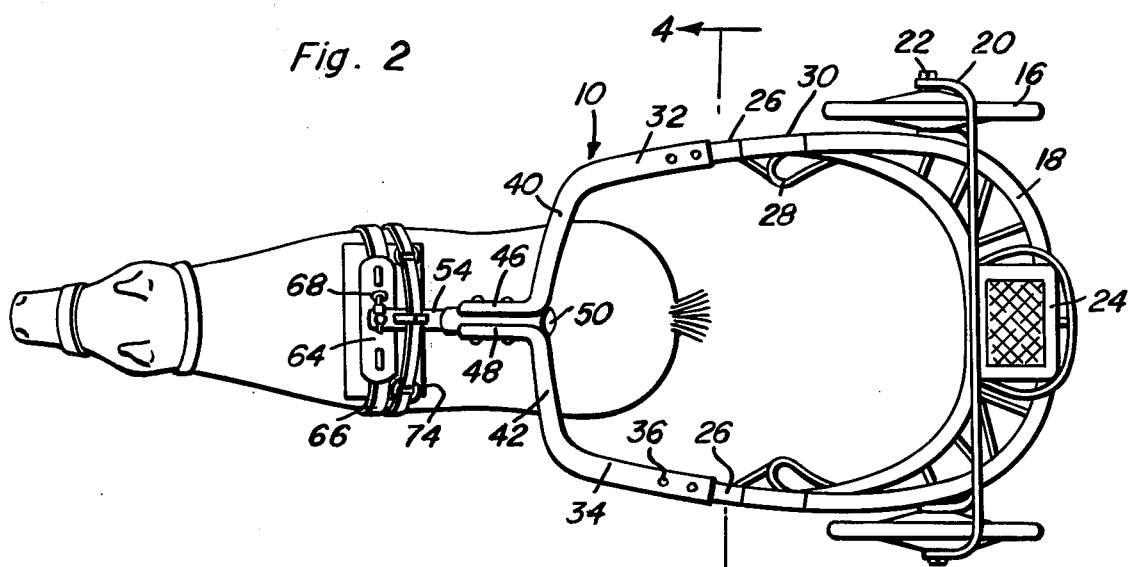
FIG. 2 is a plan view of the assembly of FIG. 1.
Figure 3:
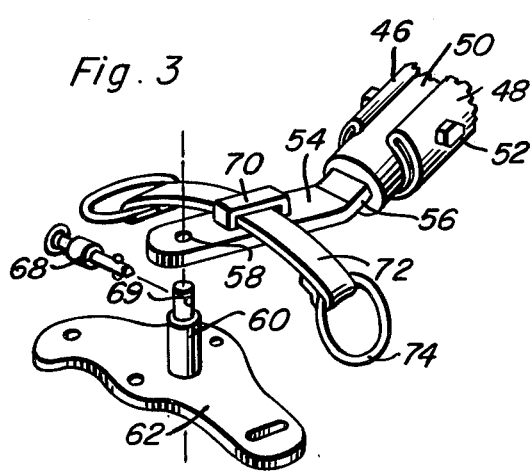
FIG. 3 is an exploded group perspective view illustrating the hitch connecting assembly for connecting the hitch to the harness on the horse.
Figure 4:
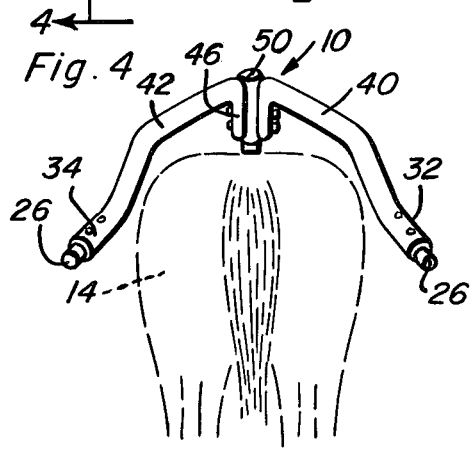
FIG. 4 is a rear view of the hitch taken generally along section line 4—4 on FIG. 2 illustrating further structural details of the hitch.

In adopting the hitch 10 of the present invention to a conventional sulky, the shafts 26 are cut off just forwardly of the stirrups 28 and the hitch 10 is connected to the shafts. The hitch 10 includes a pair of tubular members 32 and 34 which may be of light weight metal or the like such as aluminum which telescope over the cut off ends of the shafts 26 and are secured thereto by suitable fastening bolts 36 or the like. The tubular members 32 and 34 form extensions of the shafts 26 and extend in the same direction as the shafts as illustrated in FIGS. 1 and 2. The forward ends of the two tubular members 32 and 34 are provided with bends 38 which form a transition from the forwardly extending side members to a pair of upwardly and inwardly converging members 40 and 42 which generally follow the contour of the hindquarter area of the horse 14 as illustrated in FIG. 4. The members 40 and 42 are continuations of the members 32 and 34 and are of unitary construction therewith and extend to a point above the back of the horse forwardly of the hindquarters as illustrated in FIG. 1. At this point, the two members 40 and 42 are provided with acute angular bends 44 and then extend downwardly as flattened members 46 and 48 which parallel each other and are slightly spaced apart from each other and provide a longitudinal recess therebetween with the inner surfaces of the members 46 and 48 being concavely arcuate for receiving a relatively short connecting member 50 which may be of tubular construction and secured thereto by fastening bolts 52. The forward end of the connecting member 50 is provided with a forwardly extending attaching tongue or strap 54 having an obtuse angular bend 56 therein so that the tongue 54 is generally horizontally disposed when in use. The forward end of the tongue 54 is provided with an aperture 58 which is received over an upstanding connecting post 60 on a plate 62 received in the harness 64 connected with the horse 14 in a conventional manner by the use of appropriate harness bands 66. The post 60 is shouldered and extends through the aperture 58 and the tongue 54 is connected thereto by a fastening element 68 such as a push-pull spring loaded detent pin insertable through an aperture 69 in the reduced upper end of the post 60. Also, the tongue 54 is provided with an offset loop 70 therein receiving a short strap 72 having rings 74 at the ends thereof for connection with a safety strap or band 76 to retain the hitch in position even though the fastener 68 may become disengaged.

With this construction, the weight of the driver provides an upward pull or force on the hitch point rather than a downward force thus taking weight off the horse rather than adding weight thereto. This is due to the orientation of the seat rearwardly of the wheel axis and due to the upward slant of the shafts and the components of the hitch including the downwardly inclined portions 46 and 48. Also, this arrangement eliminates restrictions alongside of the horse which to some extent restricts movement of the horse. This removal of restrictions improves the speed of the horse and thus provides the advantages as the single shaft type of sulky. The driver of the sulky is associated with the sulky in the same manner with his feet spread far apart and with the horse being directly in front of the driver rather than a pole which exists in the single pole or shaft sulky and the wishbone, offset configuration of the hitch 10 follows the contour of the rear upper hindquarter area of the horse which generally will retain the horse properly aligned with the sulky which alignment is normally retained by the reins under the control of the driver but in some instances, when a single pole sulky is used, the rear portions of the horse can become laterally displaced in relation to the sulky thus reducing the speed of the horse and sulky. The hitch is of light weight construction and has an effective strength equal to if not in excess of conventional shafts and does not alter the relationship of the driver to the sulky and to the horse thereby enabling the hitch to be employed with very little practice time required. Also, the hitch facilitates the connection of the sulky to the horse and facilitates manual manipulation of the sulky when not connected to a horse. The inclusion of the conventional fork assemblies exteriorly of the wheels reduces the tendency of hooking of the wheels in the same manner as a conventional sulky which is not employed in the single shaft or single pole sulky.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a two-wheeled sulky having a frame with support assemblies rotatably supporting the wheels, a centrally disposed driver's seat on the frame above the wheels and rearwardly of the rotational axis of the wheels, a pair of forwardly and upwardly extending shafts above the wheels at the seat level and rigid with the frame with each shaft having a foot receiving stirrup oriented forwardly of the wheels and laterally outwardly of the seat to enable the driver to balance and stabilize himself in the seat, and a hitch assembly comprising a pair of side members forming extensions of said shafts, said side members including rear portions extending alongside the upper portion of the hindquarters of a horse and in laterally spaced relation thereto below the back of the horse, a pair of upwardly and inwardly extending intermediate portions forming rigid continuations of the rear portions adapted to extend upwardly and inwardly alongside the front area of the hindquarters of the horse to a point above the back of the horse forwardly of the hindquarters, a pair of forwardly and downwardly extending forward portions forming rigid continuations of the intermediate portions and extending therefrom in acute angular relation and in parallel spaced relation to each other and adapted to be disposed above the back of a horse, a downwardly and forwardly extending tongue member rigidly secured to the forward end portions, and means at the forward end of the tongue member adapted to be received on an upstanding post carried by the harness adjacent the shoulder area of the horse with the weight of the driver exerting an upward force on the harness post for removing weight from the horse.

2. The structure as defined in claim 1 wherein said hitch assembly is generally Y-shaped in configuration and generally conforms with the contour of the back and hindquarter areas of a horse for reducing restrictions of movement of a horse caused by conventional sulky shafts which extend forwardly alongside the side surface areas of a horse.

3. The structure as defined in claim 2 wherein the rearward end portion of the tongue member is disposed between the forwardly and downwardly extending forward portions of the side members for a substantial distance, and fastening means rigidly securing the tongue member and the forwardly and downwardly extending forward portions rigidly together, each of the support assemblies including a portion extending radially inwardly from the periphery of the wheel to the axis of rotation thereof at a point laterally outwardly of the wheel to prevent entanglement of the wheels on the sulky with the wheels of an adjacent sulky during a race, the rear portions of the side members overlapping the forward ends of the shafts and rear portions of the side members forming continuations of each other and being oriented adjacent the vertical plane of the wheels and laterally outwardly of the hindquarters of the horse, said sulky frame and shafts being generally U-shaped in plan configuration and combining with the Y-shaped configuration of the assembly to provide a generally oval-shaped area enclosed by the hitch assembly and sulky frame.

* * * * *